UNITED STATES PATENT OFFICE.

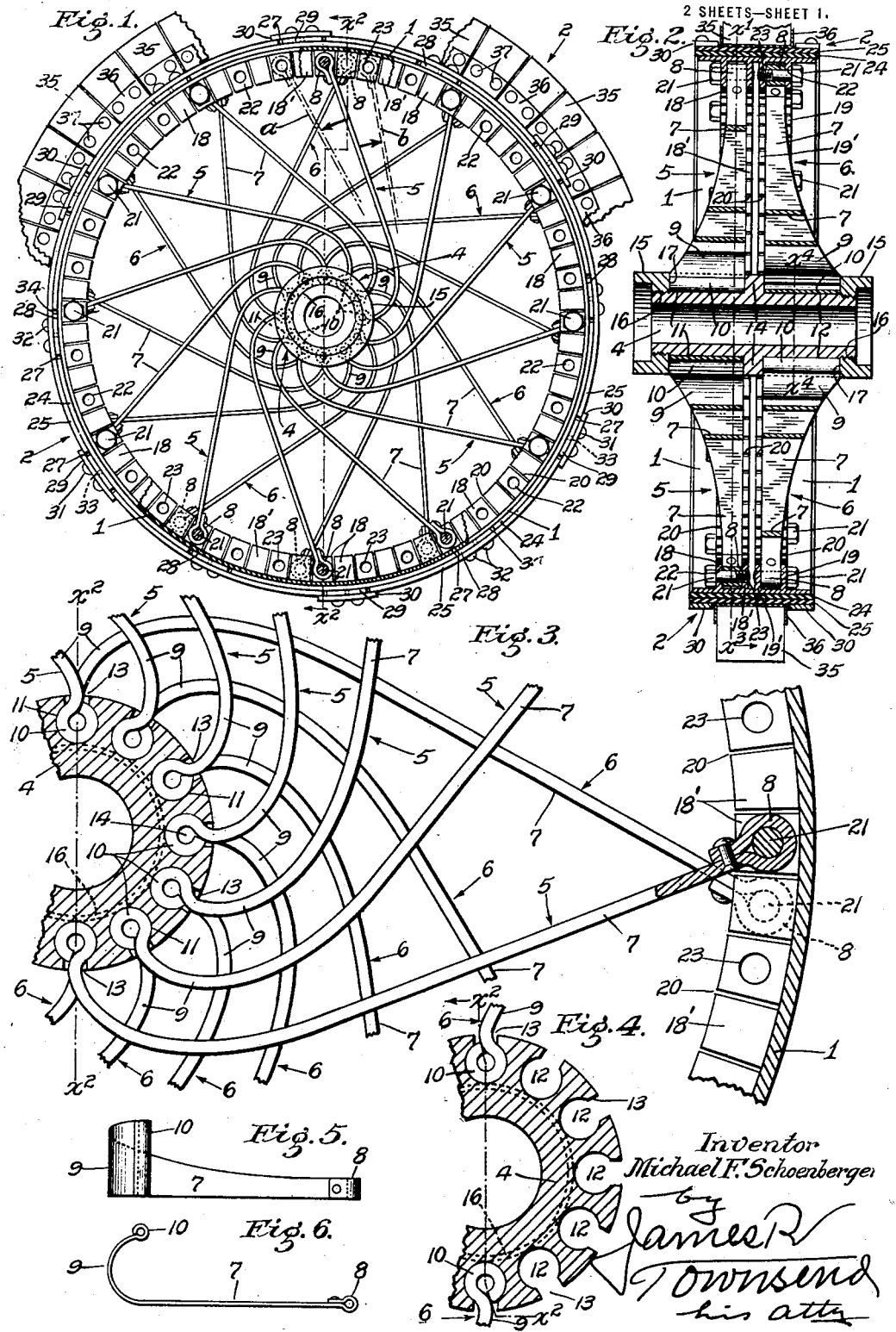

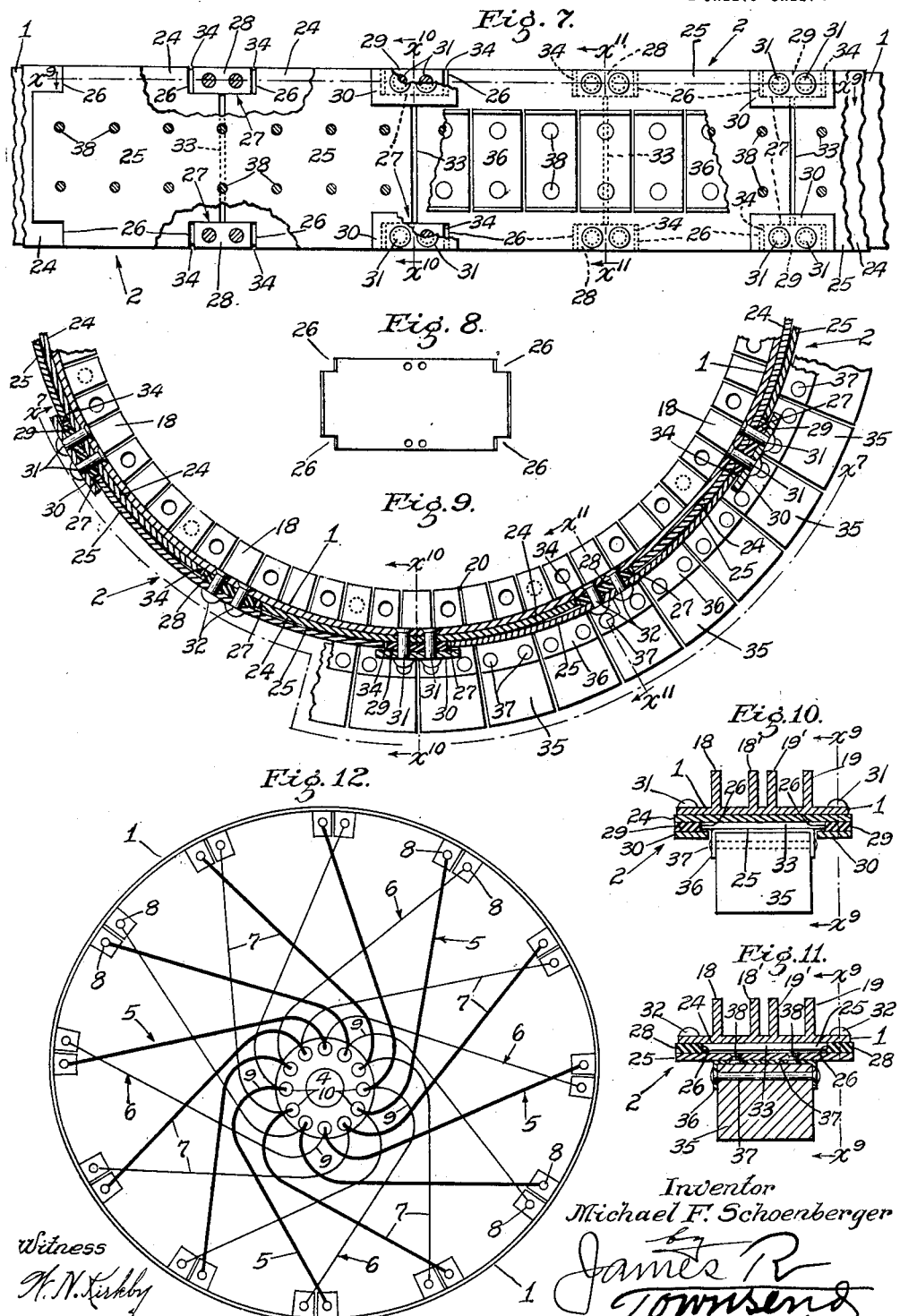

MICHAEL F. SCHOENBERGER, OF LOS ANGELES, CALIFORNIA.

RESILIENT WHEEL.

1,370,845.  Specification of Letters Patent.  Patented Mar. 8, 1921.

Application filed January 25, 1916. Serial No. 74,267.

*To all whom it may concern:*

Be it known that I, MICHAEL F. SCHOENBERGER, a citizen of the United States, residing at Los Angeles, in the county of Los Angeles and State of California, have invented a new and useful Resilient Wheel, of which the following is a specification.

My invention relates to resilient wheels for automobiles, auto trucks and other vehicles, and has for its objects to provide a light, cheap and durable wheel of this character which will afford the desired degree of resiliency and be the equivalent in function to the common form of pneumatic tires. In attaining these objects I provide spring blades to act in conjunction with an elastic rim, said spring blades being arranged between the hub and rim in two series that are axially spaced apart, the blades of one series extending in an oppositely curved direction to the blades of the other series.

A feature of the invention is the equalizing of the torsional stress upon the hub of the wheel by means of the oppositely curved arrangement of the two series of blades.

Another object is to reinforce the wheel against lateral stresses as well as securing an efficient spring action of the spring blades, and to this end the spring blades are made of greater width at the hub than at the rim, thus affording a strong reinforced construction and an easy and effective cushioning action.

A further feature of the invention is the provision of a laminated form of elastic wheel rim constructed of superimposed plates encircling the wheel, to thus afford radial inward movement of the rim under stress.

Still another object is to provide for adjustably anchoring the spring blades to the wheel rim to thereby regulate the resiliency of the whole wheel.

The invention is applicable for use in connection with heavy trucks as well as lighter vehicles.

These and other features, capabilities and advantages will become apparent from the subjoined detail description of one specific embodiment of the invention.

The accompanying drawings illustrate the invention.

Figure 1 is a side elevation, partly in section on line $x^1$—$x^3$, Fig. 2, illustrating a wheel constructed in accordance with this invention and showing parts in a normal position assumed when under no load. A portion of the block tread is shown in place upon the tire.

Fig. 2 is a transverse section on irregular line $x^2$, Fig. 1 and also on line $x^2$, Figs. 3 and 4.

Fig. 3 is an enlarged fragmental side elevation, partly in section on line $x^1$—$x^3$, Fig. 2, illustrating the mounting of the spring blades. The elastic tire encircling the resilient rim is omitted.

Fig. 4 is a fragmental section through the hub on line $x^4$, Fig. 2, showing fragments of two blades of one of the axial series mounted in place therein Fig. 5 is a view of one of the spring blades detached.

Fig. 6 is an elevation of said blade, illustrating the blade contour before assembling under tension in the wheel.

Fig. 7 is an enlarged development on circumferential line $x^7$, Fig. 9, illustrating the laminated form of tire, parts being broken away for clearness of illustration.

Fig. 8 is a detached view of one of the series of encircling tire plates.

Fig. 9 is a fragmental elevation, partly in section viewed from line $x^9$, Figs. 7, 10 and 11, illustrating the novel elastic tire structure.

Fig. 10 is a cross section on line $x^{10}$, Figs. 7 and 9.

Fig. 11 is a cross section on line $x^{11}$, Figs. 7 and 9.

Fig. 12 is a diagrammatic view illustrating the wheel as it appears under a load applied to the hub.

Arrows on the various section lines indicate the direction of sight.

In the embodiment shown the wheel rim 1 is resilient in form, being constructed of suitable material such as spring steel and is provided with suitable elastic tire means 2 which in the present instance is of a laminated form to encircle the outer periphery of the rim. Within this rim is positioned a hub 4, there being resilient means in the form of two series of spring blades 5, 6 interposed between the hub and rim, which series are spaced apart from each other axially of the wheel. Each of the series 5, 6 comprises a plurality of curved blades secured at their inner ends to the hub and anchored at their outer ends to the rim, the blades of one series extending in an oppositely curved direction to the blades of the other series.

The blades are in duplicate, one of the other and are preferably hinged to both the hub and rim to afford an efficient spring action, each blade comprising a straight limb portion 7 terminating in an eye 8 for connection to the rim, and a bowed portion 9 terminating in a cylindrical end or bulb 10 for connection to the hub, said cylindrical bulb 10 in the present instance being formed by bending the end of the bowed portion into a cylindrical eye. Each blade is curved to about a quarter turn so that when applied a radial line through the bulb 10 is about right angles to the plane of the straight limb portion 7, and so that when traced from the rim the blade of one series is joined to the hub diametrically opposite the corresponding blade of the other series, as shown in Fig. 3.

The hub 4 is provided with a plurality of stiff-joint retaining sockets uniformly spaced on its outer periphery and arranged in two adjacent series 11, 12, corresponding to the two series of blades 5, 6, respectively said sockets being cylindrical in form and provided with an axial gap 13 opening out upon the periphery. The sockets 11, 12 extend in an axial direction, those of one series being alined with those of the other series and being separated from one another by a mid-shoulder 14. Said sockets 11, 12 open out upon opposite ends of the hub respectively and each of the cylindrical bulbs 10 is positioned in place in its socket against the shoulder 14 by insertion from the open hub end, the bowed portion 9 of each blade extending through its gap 13.

The stiff-joint retaining sockets 11 and 12 retain the bulbs 10 from being withdrawn through the narrow peripheral gaps 13 and limit the vibration to make stiff joints.

Cap nuts 15 are screwed onto the threaded end spindles 16 of the hub and against the end faces 17 thereof to thus serve as retaining means to hold said blades in place in their hub sockets.

The rim is provided with two annularly-arranged series of adjacent lugs 18, 18' and 19, 19' spaced apart axially in pairs on the inner periphery of the rim, said series of lugs being adapted to anchor the outer eyes 8 of the blades, 5, 6, respectively. The lugs in the instance shown are formed by four inwardly-extending annular flanges, integral with the rim 1 and slitted transversely at equally spaced intervals therearound to form the slits 20 that serve to separate the lugs one from another and thereby permit of expansion and contraction of the elastic rim.

Said eyes 8 are mounted at equal intervals around the rim between appropriate lugs by means of the anchoring studs 21 each of which extends through a hole 22 of an outer lug 18 or 19, through the eye 8 and into the corresponding tapped hole 23 in the opposite inner lug 18' or 19'. This stud and eye arrangement forms a hinged anchorage at the rim for the outer end of each blade and permits a slight pivotal action to attend the springing of the blade.

The blades 5, 6 are assembled in place under a normal tension and act to yieldingly hold the rim and hub in predetermined relative positions to form a wheel. As the hub lowers within the rim under a load or stress applied upon said hub, see Fig. 12, the tension of the spring blades positioned above the horizontal axis of the wheel is increased, while the tension of the blades positioned below said horizontal axis is proportionately relieved, the spring action occurring in the bowed portions 9 of the blades as the same expand and contract under the weight and relief of the load respectively.

By this arrangement it is seen that the spring blades above the horizontal wheel axis are brought into commission to resiliently support the load from that portion of the wheel rim that is above the horizontal axis, the diametrically opposite spring blades at said horizontal axis serving to prevent undue spreading of the rim as well as supporting the load.

To provide a sufficiently stiff spring action at the bowed portions 9 of the blades and also to afford a strong hub construction which will effectively resist all lateral stresses, said bowed portions are reinforced by making the same of comparatively greater width, each blade preferably tapering down and straightening from its bowed portion to a narrowed portion at the eye 8. The termination or bulb 10 of each bowed portion is of a width corresponding to said increased bowed portions 9 thereby securing an extensive leverage through which said bulbs and their respective hub sockets act to support the wheel against lateral stresses.

Means are provided to adjust the tension of the spring blades and thereby render the cushioning action of the wheel more or less stiff as occasion requires, which means consists in adjustably anchoring the blades to the rim so that the bowed portion 9 of each blade may be straightened out or expanded to increase the tension by moving the anchorage of the blade end along the rim from the convex side of the bowed portion of the blade, as indicated by broken lines at $a$, Fig. 1; and may be curved or contracted to decrease the tension by moving said anchorage along the rim in the opposite direction, as at $b$.

For this purpose the alternating pairs of lugs 18, 18' of the one series are provided with the anchor holes 22 and 23 respectively to receive one of the anchoring studs and when it is desired to increase or decrease the blade tension said blade eyes may be disconnected and advanced or retracted respectively along the rim until brought into register with the appropriate holes 22, 23 when the studs may be inserted in place to again re-anchor the blades and thus adjust the resiliency of the wheel for a heavier or lighter load upon the hub.

In the present instance the outer end of one series of blades only are shown adjustably anchored to their corresponding series of lugs, the increased or decreased tension gained by adjusting one series being transmitted to the opposite series through a slight relative turning of the hub.

The curved arrangement of the spring blades causes a torsional stress or twisting effect upon the hub, which stress is equalized by the oppositely curved arrangement of the two series of blades, thus effecting a balanced condition and rendering said torsional stress nil.

The aforesaid spring blade structure may be used to advantage in connection with a rigid wheel rim to yieldingly support the hub, but affords the most efficient cushioning action when used in combination with an elastic rim to coöperate therewith.

In order that said rim may be of an elastic nature coupled with strength and durability I have provided elastic tire means of a laminated form, comprising a series of encircling plates suitably secured to the rim 1, said plates being superimposed and arranged in staggered relation one with another.

Said plates may be arranged around the rim 1 in two or more layers, two being shown in the present instance comprising inner and outer encircling plates 24, 25 respectively which are substantially in duplicate, one of the other, the inner plates 24 being arranged in staggered relation to the outer plates 25. Each plate is curved to conform to the periphery of the rim and is riveted thereto at its mid-portion, the mid portions of one layer being in position over the abutting ends of the underneath layer and the arrangement being such that the curved plate ends are free to straighten out or curve up thus to permit the rim and tire to assume an elliptical formation under load.

The plates each have their end corners cut away at 26 which cut-away portions, when the plates are arranged in position on the rim, jointly constitute rectangular side recesses 27 at the abutting ends of the plates.

Spacer blocks 28 and 29 for the inner and outer plates 24, 25 respectively are positioned in these side recesses 27, said spacer blocks being slightly thicker than the plates so as to provide a slight radial play between the abutting plate ends and the superimposed plate portion. In the case of the outer layer of plates, outside cover pieces 30 are secured to the blocks 29 and adapted to lap over the outer plate ends thereby providing the requisite radial play as well as serving to retain said outer plate ends in place.

Said spacer blocks afford means to avoid any binding action of the plate ends under change of curvature and thereby allow of a free elastic movement of the tire. Rivets 31 extend through the sides of each of the inner plates 24 at their mid-portions thereof, passing through the spacer blocks 29, outer cover pieces 30 and into the rim 1 to secure the inner plates in place upon said rim; while rivets 32 extend through the sides of each of the outer plates 25 at their mid-portions thereof, passing through the spacer blocks 28 and into the rim to secure said outer plates in place.

Gaps 33 are provided between the abutting ends of the encircling plates of each layer as well as gaps 34 that are provided between the ends of the spacer blocks and the ends of their respective recesses, said gaps affording clearance for the purpose of allowing the lengthening of the plates as they straighten out to permit the tire to assume an elliptical form while under load.

Tread blocks 35 of any desirable form and material are suitably fastened at appropriate intervals to the encircling outer plates 25 to thus form a continuous outer tread for the wheel. In the present instance, said tread blocks are secured in place between transversely-positioned clips 36 by rivets 37, said clips being suitably fastened to the outer plates as by rivets 38.

Referring to Fig. 12 it may be seen that the novel elastic tire, when used in conjunction with my spring blade structure, assumes the form of an ellipse when running under a load, with the major axis thereof always positioned in a horizontal plane and said load being carried by the blades positioned above said major axis as they successively move into this position. The sides of the elliptical formation at the major axis ends are also held within their spreading limits by the blade tension, thus supporting the wheel against collapse and rupture.

I claim:

1. A resilient wheel comprising a rim, a hub, series of spring blades arranged between the hub and rim, in which the blades of each series are similarly curved and the blades of one series are oppositely curved with respect to the blades of the other series, and each blade of either series forms with a blade of the other series, a pair having the curved faces facing each other; each blade having a short curved end and a long straight body; the curved ends of the blades of each pair being secured to the hub diametrically opposite each other, and the other end of each blade being anchored to the rim; the two series being spaced apart, and the blades of each pair converging toward and crossing near the rim.

2. A resilient wheel comprising a hub, two series of spring blades radiating from said hub, the two series being spaced apart axially and extending in oppositely curved directions, each blade of either series and a blade of the other series having a common convergence at their outer ends, a rim having two annularly arranged series of adjacent lugs spaced apart axially in pairs on its inner periphery, said lugs being provided with anchor holes, and means for each series of lugs adapted to engage the anchor holes for anchoring the outer converging ends of a series of blades, the outer ends of one series of blades being adjustably anchored to its corresponding series of lugs, the increased or decreased tension gained by adjusting one series being transmitted to the opposite series through a relative turning of the hub to thereby regulate the resiliency of the wheel.

3. A resilient wheel comprising a hub, two series of spring blades radiating from said hub, the two series being spaced axially and extending in oppositely curved directions, a rim having two annularly arranged series of adjacent lugs spaced apart axially in pairs on its inner periphery, said lugs being provided with anchor holes, eyes on the outer ends of the blades and positioned between appropriate pairs of lugs, the blade tension being adjusted by moving the eyes along said inner periphery until the eyes register with the appropriate anchor holes; and studs adapted to be inserted into the respective anchor holes in the lugs for holding the blades adjusted to the desired tension.

4. A resilient wheel comprising a hub and sets of oppositely arranged inwardly curved spring blades connecting the hub to the rim, the sets being spaced apart and arranged in pairs axially of the wheel; the curved portion of each blade being at the hub end and corresponding to the blade that is opposite thereto across the diameter of the wheel; each blade tapering toward the rim and having the straight portions of the blades that are opposite to each other tapering and converging toward each other as they approach the rim.

In testimony whereof I have hereunto set my hand at Los Angeles, California, this 17th day of January, 1916.

MICHAEL F. SCHOENBERGER.

Witness:
JAMES R. TOWNSEND.